(12) United States Patent
Shaffer et al.

(10) Patent No.: US 8,165,566 B2
(45) Date of Patent: Apr. 24, 2012

(54) FUNCTIONALITY DISTRIBUTION FOR A MOBILE ENDPOINT

(75) Inventors: Shmuel Shaffer, Palo Alto, CA (US); Labhesh Patel, San Francisco, CA (US); Ramanathan T. Jagadeesan, San Jose, CA (US); Bich T. Nguyen, Los Altos, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1209 days.

(21) Appl. No.: 11/929,461

(22) Filed: Oct. 30, 2007

(65) Prior Publication Data

US 2009/0111431 A1    Apr. 30, 2009

(51) Int. Cl.
*H04M 3/42* (2006.01)
(52) U.S. Cl. ............... 455/412.2; 455/414.1; 455/456.1
(58) Field of Classification Search ............ 455/412.2, 455/414.1, 418, 436–439, 456.1
See application file for complete search history.

(56) References Cited

U.S. PATENT DOCUMENTS

| | | | |
|---|---|---|---|
| 6,496,493 B1 * | 12/2002 | Chung | 370/332 |
| 6,771,963 B1 * | 8/2004 | Cheng et al. | 455/437 |
| 7,003,578 B2 | 2/2006 | Kanada et al. | 709/230 |
| 7,043,254 B2 * | 5/2006 | Chawla et al. | 455/456.1 |
| 7,266,099 B2 | 9/2007 | Roy et al. | 370/331 |
| 7,272,122 B2 | 9/2007 | Trossen et al. | 370/331 |
| 7,274,950 B2 | 9/2007 | Castrogiovanni et al. | 455/558 |
| 7,277,446 B1 | 10/2007 | Abi-Nassif et al. | 370/412 |
| 7,565,141 B2 * | 7/2009 | Macaluso | 455/419 |
| 7,957,763 B2 * | 6/2011 | Leon et al. | 455/551 |
| 2005/0268302 A1 * | 12/2005 | Geib et al. | 718/100 |
| 2007/0281676 A1 * | 12/2007 | Borras et al. | 455/418 |
| 2008/0014943 A1 * | 1/2008 | Ahn et al. | 455/436 |

* cited by examiner

*Primary Examiner* — Cong Tran
(74) *Attorney, Agent, or Firm* — Baker Botts L.L.P.

(57) ABSTRACT

In an embodiment, a method includes identifying a first component device of a plurality of component devices in a communication network and determining that the first component device is operable to perform a first function of a plurality of functions associated with a mobile endpoint. The method also includes distributing the first function from the mobile endpoint to the first component device in response to determining that the first component device is operable to perform a first function of the plurality of functions associated with the mobile endpoint.

25 Claims, 2 Drawing Sheets

FUNCTIONALITY DISTRIBUTION FOR A MOBILE ENDPOINT

TECHNICAL FIELD

The present disclosure relates generally to communication networks.

BACKGROUND

Communication devices typically include multiple logical components integrated together to provide a general function. In operation, each of the logical components may provide a specific function which, when combined with other components, enables the communication device to provide an array of services. As an example, a cellular phone may include a display which provides caller identification information, a loudspeaker to broadcast communications, and a microphone to receive the voice of the speaker. The combination of the display, the loudspeaker, and the microphone along with other components enables a single cellular telephone to provide telephony service to a user.

DESCRIPTION OF EXAMPLE EMBODIMENTS

Overview

In an embodiment, a method includes identifying a first component device of a plurality of component devices in a communication network and determining that the first component device is operable to perform a first function of a plurality of functions associated with a mobile endpoint. The method also includes distributing the first function from the mobile endpoint to the first component device in response to determining that the first component device is operable to perform a first function of the plurality of functions associated with the mobile endpoint.

In another embodiment, the method also includes identifying a second component device of the plurality of component devices in the communication network and determining that the second component device is operable to perform a second function of the plurality of functions provided by the mobile endpoint. The method may further include distributing the second function from the mobile endpoint to the second component device in response to determining that the second component device is operable to perform the second function of the plurality of functions provided by the mobile endpoint.

In a more particular embodiment the mobile endpoint is a mobile phone. Additionally, the first component device may be a display device and the first function includes mobile phone display functionality. Further, the second component device may be one or more speakers the second function is audio broadcast functionality.

Description

Figure 1:
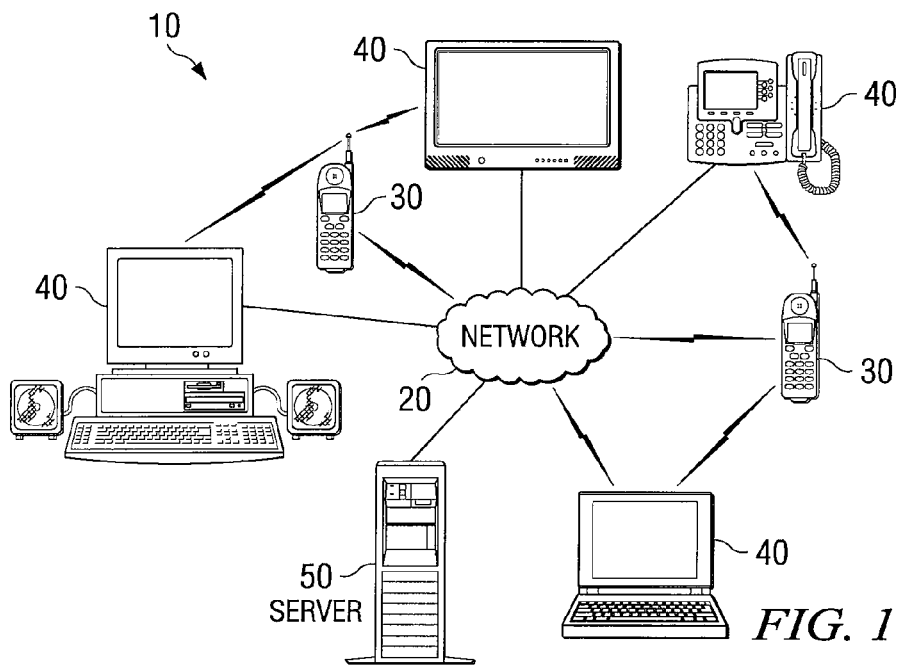
FIG. 1 is a simplified block diagram illustrating a communication system wherein the functionality provided by a mobile endpoint may be disaggregated among one or more component devices, in accordance with particular embodiments.

FIG. 1 illustrates a communication system 10 for transmitting and receiving data. Included within communication system 10 is a network 20, multiple endpoints 30, and a plurality of component devices 40. In certain embodiments the functionality associated with an endpoint 30 may be disaggregated and performed by more component devices 40.

Network 20 represents communication equipment, including hardware and any appropriate controlling logic, for interconnecting elements coupled to network 20. In particular, network 20 may enable the communication of audio and/or video telecommunication signals, data, and/or messages, including for example, signals, data, or messages transmitted through text chat, instant messaging, and e-mail. In certain embodiments, network 20 may comprise all or a portion of a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, communication network 20 may include routers, hubs, switches, gateways, call controllers, and/or any other suitable components in any suitable form or arrangement. Additionally, communication network 20 may include any hardware and/or software configured to communicate information in the form of packets, cells, frames, segments or other portions of data. Although communication network 20 is illustrated as a single network, communication network 20 may comprise any number or configuration of networks. Moreover, certain embodiments of communication system 10 may include any number or configuration of communication networks 20.

Communications over network 20 may employ any suitable communication protocol. In particular embodiments, network 20 may utilize communication protocols that allow for the addressing or identification of endpoints, nodes, and/or other components coupled to the communication network. For example, using Internet protocol (IP), each of the components coupled together by, network 10 may be identified in information directed using IP addresses. In this manner, network 20 may support any form and/or combination of point-to-point, multicast, unicast, or other techniques for exchanging media packets among components in communication system 10. Technology that allows telecommunications to be transmitted over an IP network may comprise Voice over IP (VoIP), or simply Voice over Packet (VoP). In the illustrated embodiment, one or more of endpoints 30 and component devices 40 may be IP telephony enabled devices capable of participating in instant messaging (IM), video, and other multimedia communication sessions.

In particular embodiments, network 20 may receive and transmit data in a session initiation protocol (SIP) environment. In such embodiments, endpoints 30 and component devices 40 may be SIP enabled devices. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Endpoints 30 and component devices 40 may connect to a communication network, such as network 20, in numerous ways. For instance, a connection might be made through a fixed broadband connection such as a digital subscriber line (DSL), cable modem, or Ethernet. Wireless access to network 20 may be initiated through a wireless local access network (WLAN), worldwide interoperability for microwave access (WiMAX), or wireless fidelity (Wi-Fi) access point. Further, mobile access may be permitted using code division multiple access (CDMA), CDMA2000, general packet radio service (GPRS), universal mobile telecommunications system (UMTS), evolution-data optimized (EV-DO), and/or any other suitable mobile standard or technology. In a particular embodiment, endpoints 30 and component devices 40 may communicate directly with a base transceiver station (BTS) in a cellular telephony network. While connected to a communication network, endpoints 30 and component devices 40 may communicate using any suitable communications protocol such as IP.

Endpoints 30 represent devices that may support the communication of voice, video, text or other forms of data. To provide the recited functionality, endpoints 30 may include any suitable combination of software, encoded logic, and/or hardware including one or more processors, memories, interfaces or other suitable devices. Additionally, endpoints 30 may include one or more microphones, loudspeakers, user interfaces, or displays. Examples of endpoints 30 may include PSTN telephones; IP phones; cell phones; personal digital assistants (PDAs); laptop computers; desktop computers; or any other device or component capable of facilitating voice or data exchanges within communication system 10. While FIG. 1 illustrates a particular number and configuration of endpoints 30, communication system 10 contemplates any number or arrangement of such components to support the communication of media.

Component devices 40 represent any suitable combination of hardware, software, and/or encoded logic capable of performing any one or more functions provided by an endpoint 30. Such functions may include displaying video or image based media, broadcasting an audio stream, and voice reception and transmission. Examples of component devices 40 include, but are not limited to, loudspeakers, monitors, televisions, computers, radios, microphones, and video projectors. As will be described in greater detail, component devices 40 may communicate with one or more endpoints 30 to perform all or some of the functionality provided by the endpoints 30. In certain embodiments, component devices 40 may communicate directly with one or more endpoints 30. Alternatively, component devices 40 may communicate indirectly with one or more endpoints 30 through a communication network such as network 20.

In the operation of particular embodiments, one or more component devices 40 may proxy the functionality provided by an endpoint 30. As an example, if mobile endpoint 30 is a cell phone and enters a room or other area having various enabled component devices 40, then the speaker, voice reception, and display functions may be performed by one or more of the component devices 40. In particular, the speaker function may be performed by one or more loudspeakers, voice reception may be effected by a microphone, and the display functionality may be performed by a monitor. Accordingly, the constituent parts integrated into an endpoint 30 which enable it to provide its complete functionality may be disaggregated and distributed among one or more component devices 40. Distributing the functionality associated with an endpoint 30 may include handing off the functionality to the component devices 40 and/or routing functionality to the component devices 40 through the endpoint 30. For example, endpoint 30 may handoff a wireless connection with a wireless network to one or more of the component devices. Accordingly, the component devices may communicate directly with a BTS or other wireless access point. Disaggregating the functionality provided by an endpoint 30 may offer a user enhanced service as a more suitable device may perform a function associated with one or more constituent parts of the endpoint 30.

In some embodiments, identification and/or recognition of one or more suitable component devices 40 may be facilitated by server 50. Server 50 may interface with network 20 and couple one or more component devices 40. Communications to and from an endpoint 30 may travel through the server 50 which may thereby identify suitable component devices 40 in the vicinity of the endpoint 30. Proximate component devices 40 may be identified using a directory which stores data regarding the location and functionality of various component devices 40. If one or more suitable component devices 40 are identified, then the server 50 and/or endpoint 30 may route data and other communications associated with endpoint 30 to suitable component devices 40. As an example, if endpoint 30 is currently engaged in a streaming video session and a proximate component device includes a suitable monitor, then server 50 may distribute video packets associated with the streaming video session to the proximate component device 40 for display. To provide the recited functionality, server 50 may include hardware and software, including any suitable configuration of processors, memory units, interfaces, and/or encoded logic. In certain embodiments server 50 and/or component devices 40 may be associated with an enterprise and communicate over an enterprise network. In other embodiments, server 50 and/or component devices 40 may be service provider equipment.

Identification of proximate component devices 40 proximate an endpoint 30 may also occur through direct communications between the component device 40 and endpoint 30. Such communications between component device 40 and endpoint 30 may occur through any suitable communication protocol including, wireline or wireless communication protocols such as bluetooth or other protocols. To facilitate direct identification, component device 40 and/or endpoint 30 may be equipped with suitable circuitry for transmitting and receiving signals containing identification information. In an embodiment, each component device 40 may transmit a signal containing information regarding its operability and location. In response to receiving the signal, endpoint 30 may route or otherwise transmit data associated with the function that the component device 40 is operable to perform to the respective component device 40. To illustrate, if endpoint 30 is engaged in a telephony session and a proximate component device 40 includes suitable loudspeakers, endpoint 30 may distribute audio packets associated with the session to the proximate component device 40 for broadcast over the loudspeakers. Accordingly, functionality handoff may occur through direct communications between an endpoint 30 and one or more component devices 40.

In particular modes of operation, component devices 40 may be enabled and/or disabled in response to the movement of an endpoint 30. As an example, if an endpoint 30 comes within a designated distance of a component device 40, one or more functions associated with the endpoint 30 may be disaggregated and handed off to the component device 40. By contrast, the component device 40 may be disabled when the endpoint 30 leaves the vicinity of the component device 40. Detection of proximate endpoints 30 and component devices 40 may be implemented using any suitable methods, such as radio frequency identification (RFID), global positioning system (GPS), or other technology. In some embodiments, a component device 40 may only be disabled when another component device 40 operable to perform the same functionality as the previous device is enabled. Accordingly, endpoint 30 and/or server 50 may continuously search for suitable component devices 40 to which the one or more functions provided by an endpoint 30 may be transferred. While switching between component devices 40 may be enabled, an endpoint 30 may also camp on a particular component device. Additionally, policies or preferences regarding the distribution of functionality may be enforced based on, for instance, the available component devices 40, location of endpoint 30, and/or the user.

In certain embodiments, the described disaggregation may be followed by a subsequent aggregation of the functionality provided by an endpoint 30. More particularly, endpoint 30 may return to providing some or all of its associated functionality itself without utilizing one or more component devices 40. In a particular embodiment, disaggregation and subsequent aggregation may occur automatically. Alternatively, aggregation may occur in response to a command from a user. Thus, if a user intends to leave the vicinity of an enabled component device 40, the user may preemptively restore all of the functionality to the endpoint 30.

Modifications, additions, or omissions may be made to communication system 10. For example, communication system 10 may include any number and configuration of component devices 40 and endpoints 30. Additionally, various call management elements may be included to facilitate the transfer of functionality from an endpoint 30 to one or more component devices 40. Such elements may also assist with routing and distribution of various media streams between one or more component devices 40 and an endpoint 30. Further, while certain component devices 40 have been provided for example purposes, components 40 may include any suitable device operable to perform some of the functionality provided by one or more endpoints 30.

Figure 2:
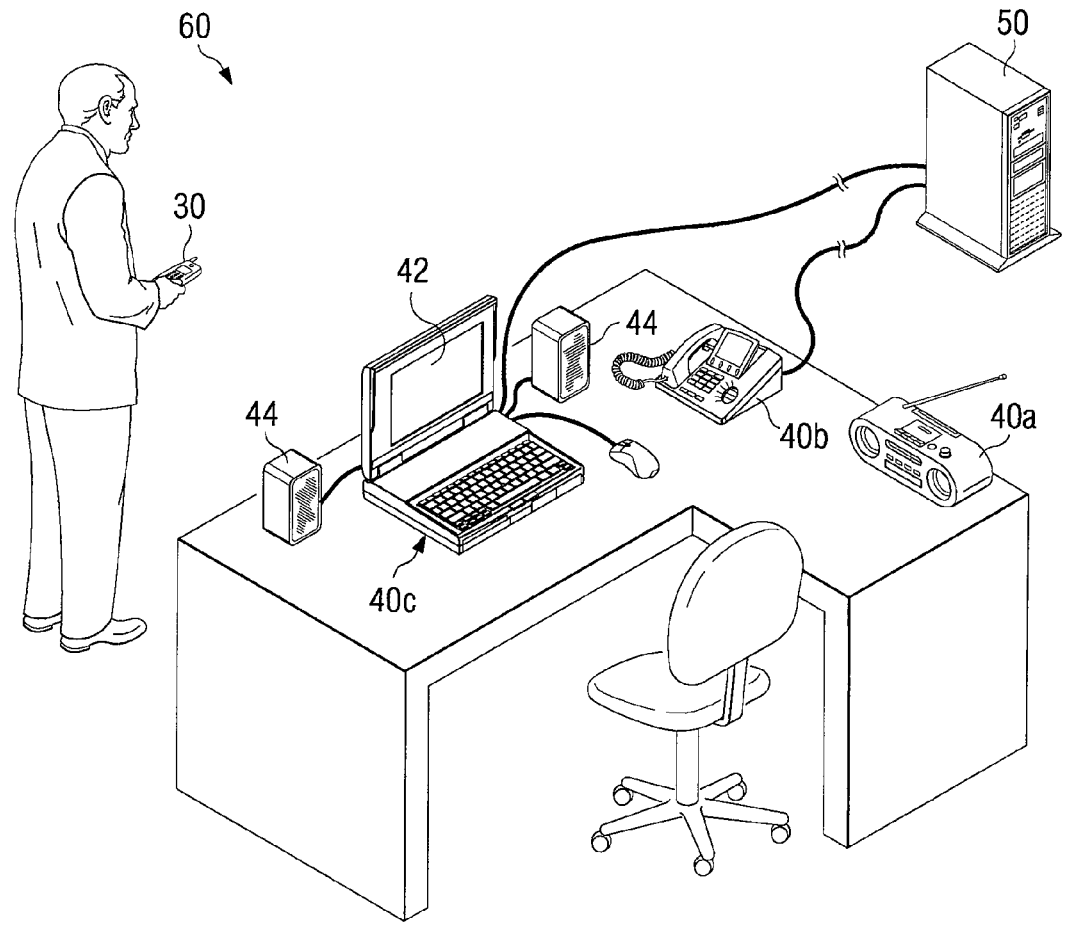
FIG. 2 is a simplified block diagram illustrating an example disaggregation scenarios in accordance with particular embodiments.
Figure 3:
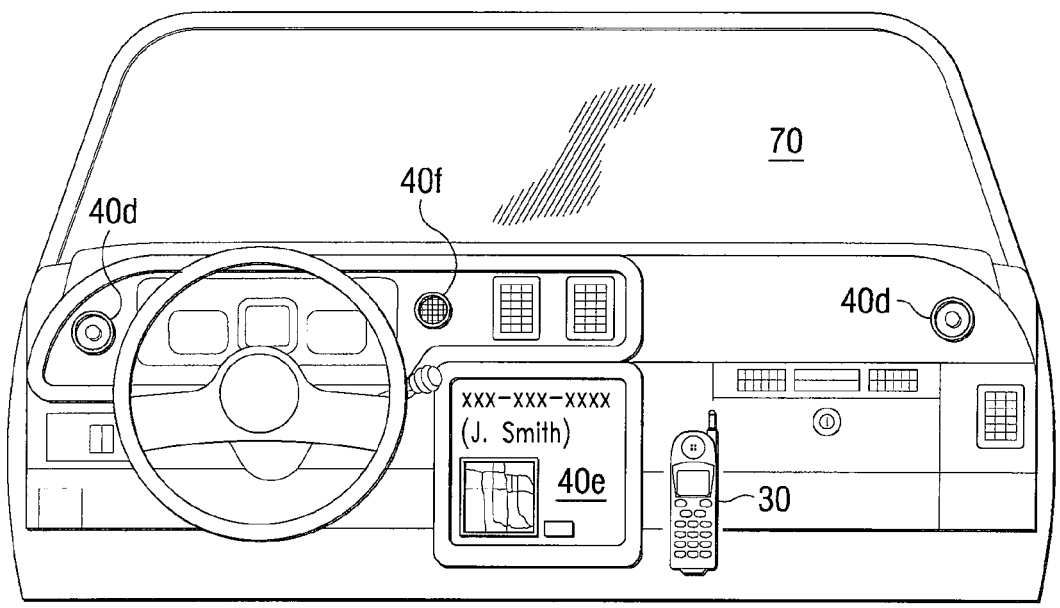
FIG. 3 is a simplified block diagram illustrating another example disaggregation scenario, in accordance with particular embodiments.

FIGS. 2 and 3 provide example disaggregation scenarios which demonstrate various interactions between component devices 40 and endpoints 30. In the example provided in FIG. 2, a user of an endpoint 30 is illustrated entering an office 60 having multiple component devices 40a-40c. In this example, endpoint 30 is a cell phone having at least speaker/amplifier, voice reception, and display functionality. As represented in FIG. 2, component device 40a is a radio having a loudspeaker, component device 40b is an IP phone having speakerphone capabilities, and component device 40c is a laptop computer having a monitor 42 and attached speakers 44. For purposes of the example, component devices 40b-40c and endpoint 30 are connected to a server 50 over a communication network such as network 20 of FIG. 1.

Continuing with the example illustrated in FIG. 2, when the user enters office 60, endpoint 30 may recognize or otherwise identify that component devices 40a-40c are in the vicinity. As discussed, identification of component devices 40b-40c may be performed directly, using any suitable technology, as each is coupled to server 50. In such situations, component device 30 may communicate with server 50 to locate component devices 40b-40c or through other components. Alternatively, the identification of each of component devices 40a-40c may be accomplished through direct communications between endpoint 30 and component devices 40a-40c. In particular, component devices 40a-40c may generate and send a signal carrying identifying information which alerts endpoint 30 of their proximity. Identifying component devices 40a-40c may include determining a respective functionality associated with each component device 40. As an example, component device 40c has a monitor 42; thus it may be operable to display various images such as videos, pictures, and/or text.

In response to identifying one or more of component devices 40a-40c, some or all of the functionality associated with endpoint 30 may be handed off or otherwise distributed among component devices 40a-40c. For example, the speaker/amplifier function may be transferred to component device 40a. Accordingly, audio data or communications received and/or generated by endpoint 30 may be transmitted for broadcast over the loudspeaker associated with component device 40a. As another example, the voice reception functionality of endpoint 30, may be transferred to component device 40b and implemented through its speakerphone feature. Thus, audio communications of a user may be received and communicated by component device 40b in a similar manner as such communications would be received and communicated by endpoint 30. In a similar manner, the display functionality of endpoint 30 may be proxied by monitor 42 of component device 40c. Accordingly video data which may contain text, photographs or other images may be transmitted to component device 40c for display. Because component devices 40b-40c are connected to server 50, transfer of the respective voice reception and video data may be facilitated through server 50. In particular, the server 50 may route, transfer, and/or distribute such communications between the respective component devices 40b-40c and endpoint 30.

In certain situations, multiple component devices 40 in the vicinity of an endpoint 30 may provide overlapping functionality. For instance, in the embodiment illustrated in FIG. 2, the speaker function may be transferred to speakers 44 connected to component device 40c in addition to the loudspeaker associated with component device 40a. In this example, the speaker function may be assigned to each of component devices 40a and 40c, or a single device may be selected to perform the function. The selection may be based on, for example, the quality of the component device 40, proximity to the component device 40, and/or any other characteristic or feature of a component device 40. Therefore if component device 40a is operable to provide higher quality sound than speakers 44, the speaker function may be transferred to component device 40d. In one example embodiment, users may set a policy which governs the utilization of the distributed component devices 40. For example, the policy may determine that in order to protect the privacy of a user speakers 44 may only be used in a closed office of the user.

FIG. 3 provides another example disaggregation scenario wherein the functionality associated with an endpoint 30 is proxied by various component devices 40d-40f in an automobile 70. In the illustrated embodiment, component devices 40d-40f represent a plurality of speakers, a display, and a microphone, respectively. For purposes of this example, endpoint 30 represents a wireless communication device having telephony capabilities.

In an example disaggregation scenario, endpoint 30 is positioned inside or near automobile 70 and receives a call. As with previous examples, endpoint 30 may identify that various component devices 40d-40f are in the vicinity and operable to provide certain functionality. When a user answers the call, endpoint 30 may automatically and simultaneously transfer the functionality associated with facilitating the call to various component devices 40d-40f. For instance, audio capabilities including the initial ring and voice of the caller may be broadcasted by component device 40d. Call identification information such as caller name, caller telephone number, and elapsed call time may be displayed by component device 40e. Further, component device 40f may proxy the voice reception functionality of endpoint 30. In certain embodiments, automobile 70 may also be equipped with a touch-screen or other suitable user interface which may be used In a further example, a user may initiate a telephone call through endpoint 30 using various component devices 40d-40f. At the outset, the user may dial a desired number. In certain embodiments, component device 40f, may be equipped with a touch-screen or other suitable user interface which may allow the user to scroll through a contact list or input a phone number to be dialed. Once the number is dialed, the call may be placed by endpoint 30. Throughout the call connection process and during the call, component devices 40d-40f may proxy the functionality provided by endpoint 30 as described above.

Modifications, additions, or omissions may be made to the examples provided in FIGS. 2 and 3. For example, automobile 70 and room 60 may contain any number and configuration of component devices 40. Moreover, while the telephony capabilities of endpoint 30 have been described in detail, endpoint 30 may support an array of other services including, but not limited, text messaging, email, as well as video messaging and playback.

Figure 4:
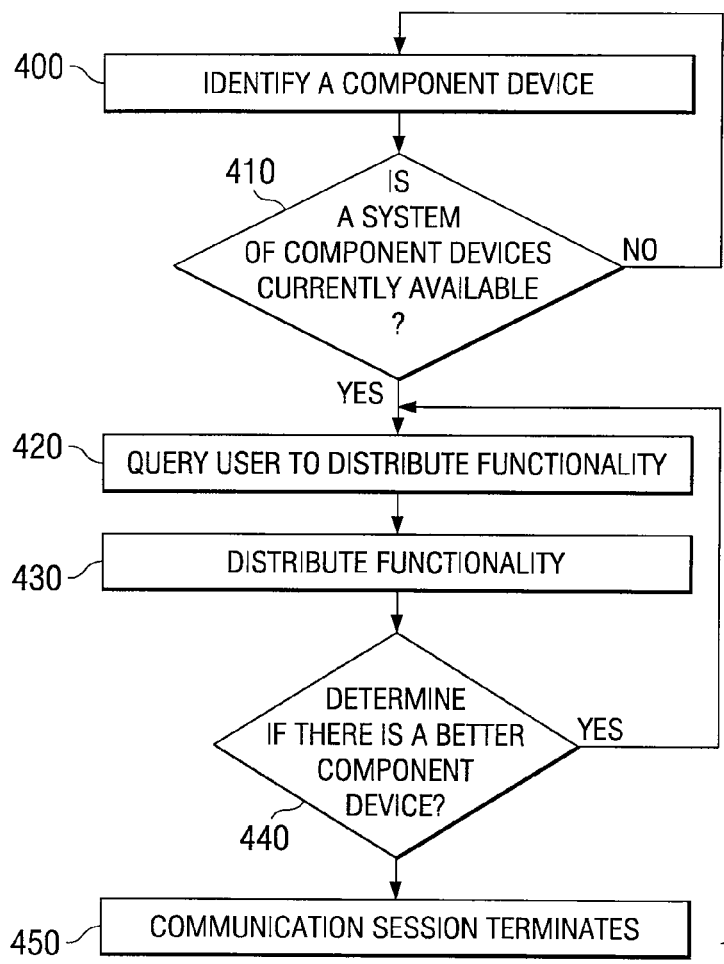
FIG. 4 is a flowchart illustrating a method for distributing functionality provided by a mobile endpoint, in accordance with particular embodiments.

With reference now to FIG. 4, a flowchart describing a method for handing off the functionality provided by a mobile endpoint 30 to one or more component devices 40 is provided. The process begins at step 400 wherein a mobile endpoint 30 and/or server 50 identifies a component device 40. Identification of a component device 40 may include locating the component device 40 in addition to determining the functionality that the component device 40 is operable to provide.

At step 410, mobile endpoint 30 and/or server 50 may determine whether there is a system. As used herein, a system includes ones or more component devices 40 which, in aggregate, are operable to facilitate the functionality provided by a mobile endpoint 30. As an example, if a mobile endpoint 30 is currently participating in a telephony session, a system may include a monitor to display caller identification information, a speaker to broadcast the remote caller's voice, and a microphone to receive the voice of the user. If there is not a system of component devices 40, mobile endpoint 30 and/or server 50 may wait to hand off the functionality until a system exists. Accordingly, the process may return to step 400 wherein handoff is delayed until a component device 40 is identified which completes the system.

If a system of component devices is currently available, then mobile endpoint 30 may query the user as to whether to distribute functionality to the system of component devices 40 at step 420. In certain embodiments step 420, may include sending a notification that a system of component devices is present. If the user elects for the functionality to be distributed to the system of component devices 40, then the functionality is handed off from mobile endpoint 30 to the component devices 40 at step 430. After distributing the functionality, mobile endpoint 30 and/or server 50 may continuously search for better component devices 40 to facilitate the functionality associated with the mobile endpoint 30 at step 440. As an example, if a mobile endpoint 30 comes within the vicinity of a better monitor than the monitor which is currently a part of the system, then the display functionality may be switched to the better monitor. Thus, if mobile endpoint 30 and/or server 50 determine that a better component device 40 is in the vicinity, the process may return to step 430 wherein the mobile endpoint 30 may query the user to handoff the functionality. This process may continue until the communication session terminates in step 450.

Some of the steps illustrated in FIG. 4 may be combined, modified or deleted where appropriate. For example, handoff may occur as each individual component device 40 is identified. Accordingly, an entire system of component devices 40 may not be required prior to distributing functionality associated with a mobile endpoint 30. Further, handoff may occur automatically without user input. In certain embodiments, additional steps may be added to the flowchart provided. Additionally, steps may be performed in any suitable order without departing from the scope of the invention.

While certain embodiments have been described in detail numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. A computer-implemented method executable on one or more processors comprising:
    identifying a first component device of a plurality of component devices in a communication network;
    determining that the first component device is operable to perform a first function of a plurality of functions associated with a mobile endpoint; and
    distributing the first function from the mobile endpoint to the first component device in response to determining that the first component device is operable to perform the first function of the plurality of functions associated with the mobile endpoint.

2. The method of claim 1, further comprising:
    identifying a second component device of the plurality of component devices in the communication network;
    determining that the second component device is operable to perform the first function of the plurality of functions provided by the mobile endpoint better than the first component device; and
    distributing the first function from the first component device to the second component device.

3. The method of claim 1, further comprising:
    identifying a second component device of the plurality of component devices in the communication network;
    determining that the second component device is operable to perform a second function of the plurality of functions provided by the mobile endpoint; and
    distributing the second function from the mobile endpoint to the second component device in response to determining that the second component device is operable to perform the second function of the plurality of functions provided by the mobile endpoint.

4. The method of claim 3, wherein:
    the mobile endpoint comprises a mobile phone;
    the first component device comprises a display device;
    the first function comprises mobile phone display functionality;
    the second component device comprises one or more speakers; and
    the second function comprises audio broadcast functionality.

5. The method of claim 3, further comprising:
    determining that a system of component devices is present, the system of component devices comprising a plurality of component devices each operable to perform at least one of the plurality of functions associated with the mobile endpoint; and distributing each of the plurality of functions from the mobile endpoint to the system of component devices in response to determining that a system of component devices is present.

6. The method of claim 5, further comprising sending a notification that a system of component devices is present prior to distributing each of the plurality of functions from the mobile endpoint to the system of component devices.

7. The method of claim 1, wherein distributing the first function occurs in response to receiving a command to distribute the first function from the mobile endpoint to the first component device.

8. The method of claim 1, further comprising:
determining that a distance between the mobile endpoint and the component device exceeds a threshold value; and
redistributing the first function to the mobile endpoint in response to determining that a distance between the mobile endpoint and the component device exceeds a threshold value.

9. An apparatus comprising a processor operable to:
identify a first component device of a plurality of component devices in a communication network;
determine that the first component device is operable to perform a first function of a plurality of functions associated with a mobile endpoint; and
distribute the first function from the mobile endpoint to the first component device in response to determining that the first component device is operable to perform the first function of the plurality of functions associated with the mobile endpoint.

10. The apparatus of claim 9, wherein the processor is further operable to:
identify a second component device of the plurality of component devices in the communication network;
determine that the second component device is operable to perform the first function of the plurality of functions provided by the mobile endpoint better than the first component device; and
distribute the first function from the first component device to the second component device.

11. The apparatus of claim 9, wherein the processor is further operable to:
identify a second component device of the plurality of component devices in the communication network;
determine that the second component device is operable to perform a second function of the plurality of functions provided by the mobile endpoint; and
distribute the second function from the mobile endpoint to the second component device in response to determining that the second component device is operable to perform the second function of the plurality of functions provided by the mobile endpoint.

12. The apparatus of claim 11, wherein:
the mobile endpoint comprises a mobile phone;
the first component device comprises a display device;
the first function comprises mobile phone display functionality;
the second component device comprises one or more speakers; and
the second function comprises audio broadcast functionality.

13. The apparatus of claim 11, wherein the processor is further operable to:
determine that a system of component devices is present, the system of component devices comprising a plurality of component devices each operable to perform at least one of the plurality of functions associated with the mobile endpoint; and
distribute each of the plurality of functions from the mobile endpoint to the system of component devices in response to determining that a system of component devices is present.

14. The apparatus of claim 13, wherein the processor is further operable to send a notification that a system of component devices is present prior to distributing each of the plurality of functions from the mobile endpoint to the system of component devices.

15. The apparatus of claim 9, wherein a processor operable to distribute the first function comprises a processor operable to distribute the first function in response to receiving a command to distribute the first function from the mobile endpoint to the first component device.

16. The apparatus of claim 9, wherein the processor is further operable to:
determine that a distance between the mobile endpoint and the component device exceeds a threshold value; and
redistribute the first function to the mobile endpoint in response to determining that a distance between the mobile endpoint and the component device exceeds a threshold value.

17. Logic encoded in one or more tangible media for execution and when executed operable to:
identify a first component device of a plurality of component devices in a communication network;
determine that the first component device is operable to perform a first function of a plurality of functions associated with a mobile endpoint; and
distribute the first function from the mobile endpoint to the first component device in response to determining that the first component device is operable to perform the first function of the plurality of functions associated with the mobile endpoint.

18. The logic of claim 17, wherein the logic is further operable to:
identify a second component device of the plurality of component devices in the communication network;
determine that the second component device is operable to perform the first function of the plurality of functions provided by the mobile endpoint better than the first component device; and
distribute the first function from the first component device to the second component device.

19. The logic of claim 17, wherein the logic is further operable to:
identify a second component device of the plurality of component devices in the communication network;
determine that the second component device is operable to perform a second function of the plurality of functions provided by the mobile endpoint; and
distribute the second function from the mobile endpoint to the second component device in response to determining that the second component device is operable to perform the second function of the plurality of functions provided by the mobile endpoint.

20. The logic of claim 19, wherein:
the mobile endpoint comprises a mobile phone;
the first component device comprises a display device;
the first function comprises mobile phone display functionality;
the second component device comprises one or more speakers; and the second function comprises audio broadcast functionality.

21. The logic of claim 19, wherein the logic is further operable to:
   determine that a system of component devices is present, the system of component devices comprising a plurality of component devices each operable to perform at least one of the plurality of functions associated with the mobile endpoint; and
   distribute each of the plurality of functions from the mobile endpoint to the system of component devices in response to determining that a system of component devices is present.

22. The logic of claim 21, wherein the logic is further operable to send a notification that a system of component devices is present prior to distributing each of the plurality of functions from the mobile endpoint to the system of component devices.

23. The logic of claim 17, wherein logic operable to distribute the first function comprises logic operable to distribute the first function in response to receiving a command to distribute the first function from the mobile endpoint to the first component device.

24. The logic of claim 17, wherein the logic is further operable to:
   determine that a distance between the mobile endpoint and the component device exceeds a threshold value; and
   redistribute the first function to the mobile endpoint in response to determining that a distance between the mobile endpoint and the component device exceeds a threshold value.

25. A system comprising:
   means for identifying a first component device of a plurality of component devices in a communication network;
   means for determining that the first component device is operable to perform a first function of a plurality of functions associated with a mobile endpoint; and
   means for distributing the first function from the mobile endpoint to the first component device in response to determining that the first component device is operable to perform the first function of the plurality of functions associated with the mobile endpoint.

* * * * *